(12) United States Patent
Lidster et al.

(10) Patent No.: US 6,451,363 B1
(45) Date of Patent: Sep. 17, 2002

(54) METHOD AND PACKAGE FOR THE PRESERVATION OF WHOLE FRUITS AND FRESH-CUT SALADS AND FLOWERS

(75) Inventors: Perry Lidster, Chilliwack (CA); Ron Wills, Wahnoonga (AU); Miriam O'Donovan, North Vancouver (CA)

(73) Assignee: The SunBlush Technologies Corporation, Vancouver (CA)

( * ) Notice: Subject to any disclaimer, the term of this patent is extended or adjusted under 35 U.S.C. 154(b) by 0 days.

(21) Appl. No.: 09/900,852

(22) Filed: Jul. 10, 2001

(51) Int. Cl.[7] .................... B65B 25/02; B65B 31/00; B65D 85/50; B65D 81/20; A23B 7/152

(52) U.S. Cl. ................ 426/106; 426/316; 426/319; 426/415; 426/419; 47/84; 206/423; 206/213.1

(58) Field of Search .................. 426/419, 415, 426/316, 319, 106; 206/213.1, 423; 47/84

(56) References Cited

U.S. PATENT DOCUMENTS

| | | | |
|---|---|---|---|
| 3,102,777 A | * 9/1963 | Bedrosian et al. | 426/419 |
| 3,450,544 A | * 6/1969 | Badran et al. | 426/419 |
| 4,055,931 A | * 11/1977 | Myers | 426/419 |
| 4,224,347 A | * 9/1980 | Woodruff | 426/316 |
| 4,711,789 A | * 12/1987 | Orr et al. | 426/419 |
| 4,842,875 A | * 6/1989 | Anderson | 426/419 |
| 4,883,674 A | * 11/1989 | Fan | 426/419 |
| 5,045,331 A | * 9/1991 | Antoon | 426/419 |
| 5,128,160 A | * 7/1992 | Fath | 426/319 |
| 5,165,947 A | * 11/1992 | Colucci et al. | 426/419 |
| 5,354,569 A | * 10/1994 | Brown et al. | 426/419 |

FOREIGN PATENT DOCUMENTS

| | | | | |
|---|---|---|---|---|
| EP | 490744 | * | 6/1992 | 426/419 |
| WO | WO94/15475 | * | 7/1994 | 426/419 |
| WO | WO 99/15022 | * | 4/1999 | 426/419 |

OTHER PUBLICATIONS

Biologia Plantarum 41(1):1–10, 1998, Copy in 426/419.*
Packaging Japan, pp. 17 Plus Copy in 426/419, Nov. 1985.*
Food Technology, p. 70 Plus Copy in 426/419, Sep. 1988.*
CSIRO Food Res Q 44(3) p. 25 PWS Copy in 426/419, 1984.*
Controlled/Modified Atmoshpere/Vacuum Packaging of Foods (Food & Nutrition PN655, p. 67 Plus Copy in 426/419, 1989.*
Produce Marketing Almanac, p. 23 Plus Copy in 426/419, 1987.*
Modern Packaging 40,# 2, p. 169 Plus Copy in 426/419, 1966.*

* cited by examiner

Primary Examiner—Steve Weinstein
(74) Attorney, Agent, or Firm—Oyen Wiggs Green & Mutala

(57) ABSTRACT

This invention relates to a novel method for the storage and transport of fresh fruit, vegetables and cut flowers. More particularly, this invention pertains to a novel method to prolong the postharvest life of such horticultural produce that is packaged in a modified atmosphere by the inclusion of a small amount of nitric oxide gas into the package.

7 Claims, No Drawings

METHOD AND PACKAGE FOR THE PRESERVATION OF WHOLE FRUITS AND FRESH-CUT SALADS AND FLOWERS

FIELD OF INVENTION

This invention relates to a novel method for the preservation, packaging and shipping whole fruits, fresh-cut salads and fresh-cut flowers. More particularly, this invention pertains to novel methods to prolong shelf life of packing whole fruits, fresh-cut salads and fresh-cut flowers in modified atmospheres packaging with the addition of nitric oxide (NO). The nitric oxide is added to the modified atmosphere at the time the package is sealed.

BACKGROUND OF INVENTION

The quality attributes of freshly harvested fruits, vegetables (called "produce") and cut flowers need to be maintained after harvest to ensure produce reached the consumer in an acceptable condition. Quality deterioration of harvested horticultural produce is caused by a range of natural reactions such as respiration, ripening and senescence, through microbial growth and by evaporation of water. Methods of inhibiting the rate of deterioration from all causes include reduction of the produce temperature, and creation of a low $O_2$/high $CO_2$ modified atmosphere (MA) around the produce Modified atmosphere packaging (MAP) of fruits, vegetables and horticultural products involves packing produce in a sealed but gas-permeable package system and generating the MA by introducing a gas comprising a predetermined ratio of $CO_2$ and $O_2$ into the headspace of the package or allowing the natural respiration of the produce to develop desired levels of $CO_2$ and $O_2$ in the headspace of the package. During storage, the wall permeability of the MAP system regulates the influx of $O_2$ relative to the efflux of $CO_2$ from the package headspace to achieve and/or maintain a suitable MA equilibrium in the headspace around the stored produce. This establishes an optimum environment for retention of the quality attributes of the fresh produce and reduces detrimental microbial growth in the produce.

There are, however, many problems in maintaining the optimum levels of $CO_2$ and $O_2$ inside a package that maximize the retardation of deterioration, and hence maximize the postharvest life of the produce. One problem can be due to difficulty in maintaining the desired temperature throughout the marketing and transport chain of the MAP package. A common scenario is for the temperature to be considerably higher than the optimum. A higher temperature radically changes the modified atmosphere inside the MAP with the $CO_2$ rising and the $O_2$ decreasing in concentration. This increases respiration of the produce at the higher temperature and accelerates deterioration. Such changes in atmosphere can be outside the safe $CO_2$ and $O_2$ levels and result in the development of off-flavors, undesirable browning of tissues and a general reduction in postharvest life of the produce. Where temperature variations are likely to occur in the marketing of produce, a prudent MAP operator will opt to have a lower level of $CO_2$ and higher level of $O_2$ than the optimum in the MAP to provide a safety margin for changes in atmosphere due to changes in temperature during marketing. The end result is that the extension time in postharvest life achieved by the MAP is less than would be achieved if the optimal modified atmosphere is used.

A second problem arises from difficulty in achieving an identical modified atmosphere in all boxes of produce in a batch of seemingly uniform produce. Variation will occur due to differences in maturity and hence respiration or degree of ripeness within a batch of produce, differing degrees of microbial contamination, variability in the permeability of the package film and outer container, as well as different degrees of sealing a package. The overall effect is that a range of atmospheres will be generated in any batch of MAP. In order to ensure that an unsafe extreme atmosphere is not developed, the best MAP will have the optimum atmosphere to retard deterioration but all others will have a suboptimal modified atmosphere to varying degrees with associated shortened postharvest life.

Thus, while properly controlled low $O_2$ levels and elevated $CO_2$ levels in the MAP headspace around a fresh fruit, vegetable or cut flower reduce the respiration and ripening rate of the fresh produce, and the growth of spoilage organisms, and leads to a slower the rate of deterioration of produce, the effect is still only a slowing of metabolism. Some loss of quality is still occurring, albeit, at a much reduced rate. When the use of sub-optimal atmospheres occurs, either by design or accident, the reduction in the rate of deterioration is even less pronounced.

These variability factors therefore create the potential for the use of additional treatments that can, independently of the modified atmosphere, exert a beneficial effect in retarding loss of quality in harvested horticultural produce.

Ethylene generation is an important factor in the deterioration of fresh fruit, vegetables and cut flowers. Ethylene is well known to accelerate deterioration in horticultural produce. These effects are seen by initiation of premature ripening, acceleration of loss of colour and texture, induction of microbial growth, induction of physiological disorders and other browning symptoms.

Ethylene is generated by all horticultural produce. When produce is held in ambient air, the ethylene concentration is relatively low due to dilution in the atmosphere. However, in the confined space of postharvest containers, such as in a MAP, ethylene can accumulate to relatively high concentrations. Traditionally, a threshold concentration of 0.1 $\mu L/L$ ethylene is considered a safe limit of ethylene exposure. However, recent studies in Australia on a wide range of horticultural produce has shown there is no safe level of ethylene exposure and that concentrations of ethylene greater than 0.005 $\mu L/L$ generate a deleterious response. Across the whole range of concentrations, it has been found that the rate of deterioration of horticultural produce increases with increase in ethylene concentration.

The level of ethylene that accumulates in a MAP can be quite high with concentrations in the range 1–10 $\mu L/L$ commonly encountered in commercial practice. While a modified atmosphere does give some inhibition of the deleterious effects of ethylene, it has been found that an ethylene concentration of 1 $\mu L/L$ around cut lettuce held in a MAP reduces the effective postharvest life of the lettuce by 50%. Thus, the use of a technology that inhibits the action of ethylene on produce held in a MAP would provide an additional extension to the useful postharvest life of fresh fruit, vegetables and cut flowers independently of the modified atmosphere.

Australian. Patent No. PCT/AU98/00799 discloses an invention to extend the postharvest life of perishable horticultural produce stored in ambient air through the short term fumigation with low concentrations of nitric oxide gas prior to storage. A typical effective treatment is cited as placing produce in a fumigation chamber for 2–6 hours in an atmosphere containing 5 $\mu$L/L nitric oxide and a very low concentration of oxygen. After the treatment, the produce is stored in a ambient air conditions containing ethylene at concentrations found in normal horticultural marketing situations. The postharvest life of produce fumigated with nitric oxide is purportedly extended by 20–200% over untreated produce and the rate of water loss is purportedly reduced by 15–30%. The benefit of the treatment is attributed to inhibiting the action of ethylene on the horticultural produce.

SUMMARY OF INVENTION

The invention is directed to a method of prolonging the postharvest life of a perishable horticultural produce after harvest which comprises placing the produce in a package with a modified atmosphere and adding nitric oxide to the modified atmosphere.

The nitric oxide can be injected into the modified atmosphere of the package after the package is sealed. The nitric oxide can be added to the package in an amount which provides a concentration of nitric oxide in the modified atmosphere of the package of between 1.0 and 200 $\mu$L/L. The nitric oxide can be permitted to remain in the package until the package is opened for marketing. The horticultural produce can be fruit, vegetables or cut flowers.

The invention is also directed to a modified atmosphere package containing a perishable horticultural produce, and a postharvest produce life prolonging modified atmosphere containing oxygen, carbon dioxide and nitric oxide. The modified atmosphere can contain a below ambient atmosphere level of oxygen and an above ambient atmosphere level of carbon dioxide. The concentration of nitric oxide can be between 1.0 and 200 $\mu$L/L.

DETAILED DESCRIPTION OF INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention relates to a method for reducing the rate of deterioration and hence extending the postharvest life of fresh fruit, vegetables and cut flowers that are held in a modified atmosphere (MA) by the addition of nitric oxide gas into the headspace atmosphere of the MAP.

Previously, fresh horticultural produce has been fumigated with nitric oxide gas for a short period, typically 2–6 hours, in an atmosphere with a low concentration of oxygen. The produce is then removed from the fumigation chamber and stored in a normal ambient air atmosphere. The benefit of the short nitric oxide fumigation produces a long term extension in postharvest life beyond the short period of exposure to the nitric oxide.

We have discovered that when nitric oxide is injected into a MAP containing fresh fruit, vegetables or cut flowers soon after sealing the MA package and no steps are taken to subsequently remove the nitric oxide or its decomposition products from the MAP, the postharvest life of the horticultural produce is extended well beyond that for the same produce held continuously in a normal air atmosphere, or produce held in a MA without added nitric oxide.

The MAP may consist of corrugated paperboard boxes with an inner liner coated with a range of gas permeable polymers, gas permeable bags which are used alone or placed within a box and/or thermoformed plastic containers with a sealed top web. The polymer or container can be at least partially permeable to oxygen and carbon dioxide. The gas permeabilities of the polymer, coated paperboard, bags and/or thermoformed containers can be between 0.1 and 50,000 cc$^3$/m$^2$ 1 24 hr. 1 atm at 20° C.

Nitric oxide can be introduced into the MAP by direct injection into a sealed paperboard or corrugated box and/or polymer bag. A predetermined amount of NO can be delivered by timing a known flow rate and concentration of nitric oxide into the package. A sharpened stainless steel probe can be easily designed for direct insertion through the package walls. The hole created by removal of the probe can be easily sealed by an impermeable adhesive tape. Nitric oxide can be delivered to bags and thermoformed trays at the time of sealing the top web onto the tray. The sealing machine can replace the ambient atmosphere within the package with premix gas containing appropriate amounts of oxygen, carbon dioxide, nitric oxide and nitrogen to give the desired results.

Table 1 shows the effect of modified atmosphere and nitric oxide on the time to ripen of mature but unripe El Dorado cantaloupe that was held at 5° C. for 20 days to simulate a refrigerated transport container, then left to ripen in air at 20° C. to simulate removal from the container in a normal wholesale/retail marketing situation. Fruit held in air at 5° C. was found to be ripe on the day of removal from 5° whereas fruit held in the MA ripened after 5 days. Fruit in the MA with 10 $\mu$L/L nitric oxide (NO) added at the time of sealing did not ripen until after 8 days.

TABLE 1

Effect of MA and nitric oxide on retarding the time to ripen of cantaloupe fruit

| Days at 5° C. | Treatment | CO$_2$ (%) | O$_2$ (%) | Time to ripen at 20° C. (days) |
|---|---|---|---|---|
| 20 | Air | 0 | 21 | <1 |
|  | MA | 5 | 15 | 5 |
|  | MA + NO | 6 | 14 | 8 |

Table 2 shows a similar benefit on the time to ripen from the combined use of MA and nitric oxide on another climacteric fruit, R2E2 mangoes, that were stored at 13° C. for 19 days to simulate chilled transport then examined for the presence of chilling injury then allowed to ripen in air at 13° C. or 20° C. until ripe to simulate wholesale/retail marketing. Mangoes stored in MA showed much less chilling injury than fruit held in air while the use of MA+NO showed the lowest incidence of chilling injury. Mangoes held in air were fully ripe on the simulated arrival date in the market while the time to ripen of fruit held in MA+10 $\mu$L/L NO took 12 and 4 days to ripen at 13° and 20° C., respectively, which was substantially longer than that taken for mangoes held in MA only.

TABLE 2

Effect of MA and nitric oxide on retarding the time to ripen of mango fruit

| Days at 13° C. | Treatment | $CO_2$ (%) | $O_2$ (%) | Chilling injury score* | Time to ripen (days) at 13° C. | Time to ripen (days) at 20° C. |
|---|---|---|---|---|---|---|
| 19 | Air | 0 | 21 | 3.4 | 0 | 0 |
|  | MA | 9 | 12 | 1.3 | 3 | 2 |
|  | MA + NO | 13 | 7 | 1.1 | 12 | 4 |

*1 = none, 5 = very severe, 3 = limit of acceptability

The combination of MA and nitric oxide also showed substantial benefit on the senescence of nonclimacteric produce such as strawberries. Table 3 shows that Pajero strawberries stored at 3° C. until they were unacceptable for marketing due mainly to the development of rotting had the longest postharvest life when stored in a MA+5 $\mu$L/L NO which was more than double that of strawberries held in air.

TABLE 3

Effect of MA and nitric oxide on retarding the senescence of strawberry fruit

| Treatment | $CO_2$ (%) | $O_2$ (%) | Storage life (days) |
|---|---|---|---|
| Air | 0.8 | 19.8 | 9 |
| MA | 2.5 | 12.0 | 17 |
| MA + NO | 2.2 | 10.1 | 20 |

The combination of MA and nitric oxide showed considerable ability to extend the vase life of flowers after a simulated cool transport situation. Table 4 shows the vase life of White Sim carnations stored at 3° C. for 22 days then held in a vase with water at 30 and 20° C. to simulate marketing situations. Carnations stored in air were extremely wilted at the end of the simulated transport situation. Flowers stored in MA were in an acceptable condition after 12 days and had a substantial vase life at both 20° and 3° C. Flowers stored in MA+100 $\mu$L/L NO had a considerable vase life at both temperatures and was greater than that for flowers held in MA only.

TABLE 4

Effect of MA and nitric oxide on the vase life of carnation flowers

| Days at 30° C. | Treatment | Vase life (days) at 20° C. | Vase life (days) at 3° C. |
|---|---|---|---|
| 22 | Air | — | — |
|  | MA | 3 | 15 |
|  | MA + NO | 8 | 24 |

Table 5 shows the effect of MA and nitric oxide on five varieties of rose (Jaguar, Profita, Golden Gate, Frisco and Jazz) that were stored for 12 days at 10° C. then examined for ornamental quality by the "relative quality index" which represents the sum of number of flowers at the opening stage at a specific day with the mean values for each treatment related as higher or lower than the overall mean value. Across the five rose varieties, the use of MA+5 $\mu$L/L NO resulted in a much higher quality of flower than in the MA alone or the air stored flowers.

TABLE 5

Effect of MA and nitric oxide on the vase life of rose flowers

| Treatment | Golden Gate | Profita | Jaguar | Jazz | Frisco | Total |
|---|---|---|---|---|---|---|
| Air | − | ○ | − | ○ | ○ | −2 |
| MA | ○ | + | − | ○ | − | −1 |
| MA + 5 $\mu$L/L NO | + | + | ○ | + | + | +4 |
| MA + 10 $\mu$L/L NO | ○ | − | + | + | ○ | +1 |

MA in all boxes was 3–4% $CO_2$ and 17–18% $O_2$

A similar effect was obtained from commercial minimally processed iceberg lettuce and lettuce mixes ("Salad Bowl" containing Iceberg, Lolla Rossa, Radicchio; "Santa Barbara" containing Escarole, Radicchio, Lambs lettuce and Frisse; "Garden Salad" containing Iceberg, Romaine, carrots, red cabbage and radish) that was stored between 6 to 7° C. Lettuces treated with MA+5 $\mu$L/L NO were organoleptically more acceptable for odor, appearance and texture than the MA only samples at all analytical times. On average, across all lettuce types, shelf life of lettuces held in the MA+NO was extended to 10 to 12 days from 7 days when held in MA only.

TABLE 6

Effect of MA and nitric oxide on shelf life of commercially packaged lettuce

| Treatment | Iceberg | Salad Bowl | Santa Barbara | Garden Salad |
|---|---|---|---|---|
| MA | 7 | 7 | <7 | 7 |
| MA + 5 $\mu$L/L | 12 | 10 | 7 | 11 |

Thus, where unripe climacteric fruit is transported to a distant market in an MAP, the addition of nitric oxide into the package soon after sealing extends the time that unripe fruit could be marketed by 50–300% over that of produce held in the MAP without added nitric oxide.

Where cut flowers are similarly transported to a distant market in an MAP with the addition of nitric oxide soon after sealing, the vase life during marketing is extended by 50–250% over that of produce held in an MAP without added nitric oxide.

Where nonclimacteric fruit and vegetables, and minimally processed lettuce salads are held in a MAP with the inclusion of nitric oxide soon after sealing the package, the postharvest life is increased by 30–100% over produce held in an MAP only.

Only a low concentration of nitric oxide is required to achieve a substantial extension in postharvest life for all produce. While the optimum nitric oxide concentration in the MA environment varies between produce, the most effective concentration is in the range 1–200 $\mu$L/L.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of prolonging the post-harvest life of a perishable, horticultural produce after harvest which comprises sealing the produce in a package having a wall permeability of between 0.1 and 50,000 cc$^3$/m$^2$ 1 24 hr. 1 atm at 20° C. along with a modified atmosphere which has a concentration of oxygen below ambient atmospheric oxygen concentration and a concentration of carbon dioxide above ambient atmosphere carbon dioxide concentration and adding exogenous nitric oxide to said sealed package and the modified atmosphere in an amount sufficient to inhibit the generation of ethylene from said sealed packaged produce.

2. The method according to claim 1 where the nitric oxide is injected into the modified atmosphere of the package after the package is sealed.

3. The method according to claim 2 where the nitric oxide is added to the package in an amount which provides a concentration of nitric oxide in the modified atmosphere of the package of between 1.0 and 200 $\mu$L/L.

4. The method according to claim 3 where the nitric oxide is not removed from the package until the package is opened for marketing.

5. The method according to claim 4 where the horticultural produce comprises fruit, vegetables or cut flowers.

6. A sealed modified atmosphere package having a wall permeability of between 0.1 and 50,000 cc$^3$/m$^2$ 1 24 hr. 1 atm at 20° C. containing a perishable horticultural produce, and a postharvest produce life prolonging modified atmosphere containing a below ambient atmosphere level of oxygen, an above ambient atmosphere level of carbon dioxide and nitric oxide exogenously added to said sealed package in an amount sufficient to inhibit the generation of ethylene from said sealed packaged produce.

7. The package of claim 6 wherein the concentration of nitric oxide is between 1.0 and 200 $\mu$L/L.

* * * * *